(12) United States Patent
De Goeij et al.

(10) Patent No.: US 12,498,077 B2
(45) Date of Patent: Dec. 16, 2025

(54) AIR DUCT AND AIR SYSTEM AND METHODS AND USES OF SAID AIR DUCT AND AIR SYSTEM

(71) Applicant: DEC Technologies B.V., Enschede (NL)

(72) Inventors: Theodorus Anthonius De Goeij, Enschede (NL); Siraç Gül, Enschede (NL)

(73) Assignee: DEC TECHNOLOGIES B.V., Enschede (NL)

( * ) Notice: Subject to any disclaimer, the term of this patent is extended or adjusted under 35 U.S.C. 154(b) by 438 days.

(21) Appl. No.: 18/030,249

(22) PCT Filed: Oct. 5, 2021

(86) PCT No.: PCT/EP2021/077418
§ 371 (c)(1),
(2) Date: Apr. 4, 2023

(87) PCT Pub. No.: WO2022/073988
PCT Pub. Date: Apr. 14, 2022

(65) Prior Publication Data
US 2023/0366584 A1    Nov. 16, 2023

(30) Foreign Application Priority Data
Oct. 6, 2020    (EP) .................................... 20200296

(51) Int. Cl.
*F16L 59/153*    (2006.01)
*F16L 53/34*    (2018.01)
(Continued)

(52) U.S. Cl.
CPC .............. *F16L 59/153* (2013.01); *F16L 53/34* (2018.01); *F24F 13/0218* (2013.01);
(Continued)

(58) Field of Classification Search
CPC . F16L 53/34; F16L 53/37; F16L 53/38; F16L 59/153; F24F 13/0218; F24H 9/1863
See application file for complete search history.

(56) References Cited

U.S. PATENT DOCUMENTS 9,046,207 B2 * 6/2015 Bigex .................... B32B 27/304
10,285,223 B2 * 5/2019 Hatton ...................... H05B 3/14
(Continued)

FOREIGN PATENT DOCUMENTS

| CN | 111182662 A | 5/2020 | |
| EP | 0312204 | 9/1988 | ............... H05B 3/14 |

(Continued)

OTHER PUBLICATIONS

European Search Report issued in EP Patent Appln. Serial No. 20200296.0-1002, dated Mar. 9, 2021, 8 pages.
(Continued)

*Primary Examiner* — Nicholas L Foster
(74) *Attorney, Agent, or Firm* — HAYES SOLOWAY P.C.

(57) ABSTRACT

Disclosed is an air duct and an air system and methods and uses of said air ducts and air system. The air duct has electrically conductive elements integrated with the walls of said air ducts for insulation of walls of said air ducts, and/or heating of the air flowing through the air ducts. The air duct can be used in an air system, for instance an air system for purposes of air cleaning, heating, refrigeration, ventilation or air conditioning in a building or means of transport.

8 Claims, 1 Drawing Sheet

(51) Int. Cl.
*F16L 53/37* (2018.01)
*F16L 53/38* (2018.01)
*F24F 13/02* (2006.01)
*F24H 9/1863* (2022.01)

(52) U.S. Cl.
CPC .............. *F16L 53/37* (2018.01); *F16L 53/38* (2018.01); *F24H 9/1863* (2013.01)

(56) References Cited

U.S. PATENT DOCUMENTS

| | | | |
|---|---|---|---|
| 10,743,372 B2 * | 8/2020 | Lewandowski | H05B 3/18 |
| 2010/0175469 A1 * | 7/2010 | Ni | F16L 53/38 |
| | | | 73/204.27 |
| 2012/0234421 A1 | 9/2012 | Powell et al. | |
| 2013/0108250 A1 * | 5/2013 | Bigex | F16L 53/34 |
| | | | 392/468 |
| 2016/0227611 A1 * | 8/2016 | Hatton | H05B 3/56 |
| 2017/0328497 A1 | 11/2017 | Dantin | F16L 11/10 |

FOREIGN PATENT DOCUMENTS

| | | | |
|---|---|---|---|
| EP | 1589270 | 10/2005 | ............. F16L 11/127 |
| EP | 3211349 | 8/2017 | ............... F24H 3/04 |
| JP | 58-2886 | 6/1983 | |
| JP | S6217494 A | 1/1987 | |
| JP | H01132089 A | 5/1989 | |
| JP | 2009287906 A | 12/2009 | |
| WO | 2014188101 | 11/2014 | ............. F16L 53/00 |
| WO | 2015123376 | 8/2015 | ............. F16L 53/00 |
| WO | 2017114333 | 7/2017 | ............. F16L 11/12 |

OTHER PUBLICATIONS

International Search Report and Written Opinion issued in PCT/EP2021/077418, dated Jan. 20, 2022, 9 pages.
International Preliminary Report on Patentability issued in PCT/EP2021/077418, dated Sep. 6, 2022, 12 pages.

* cited by examiner

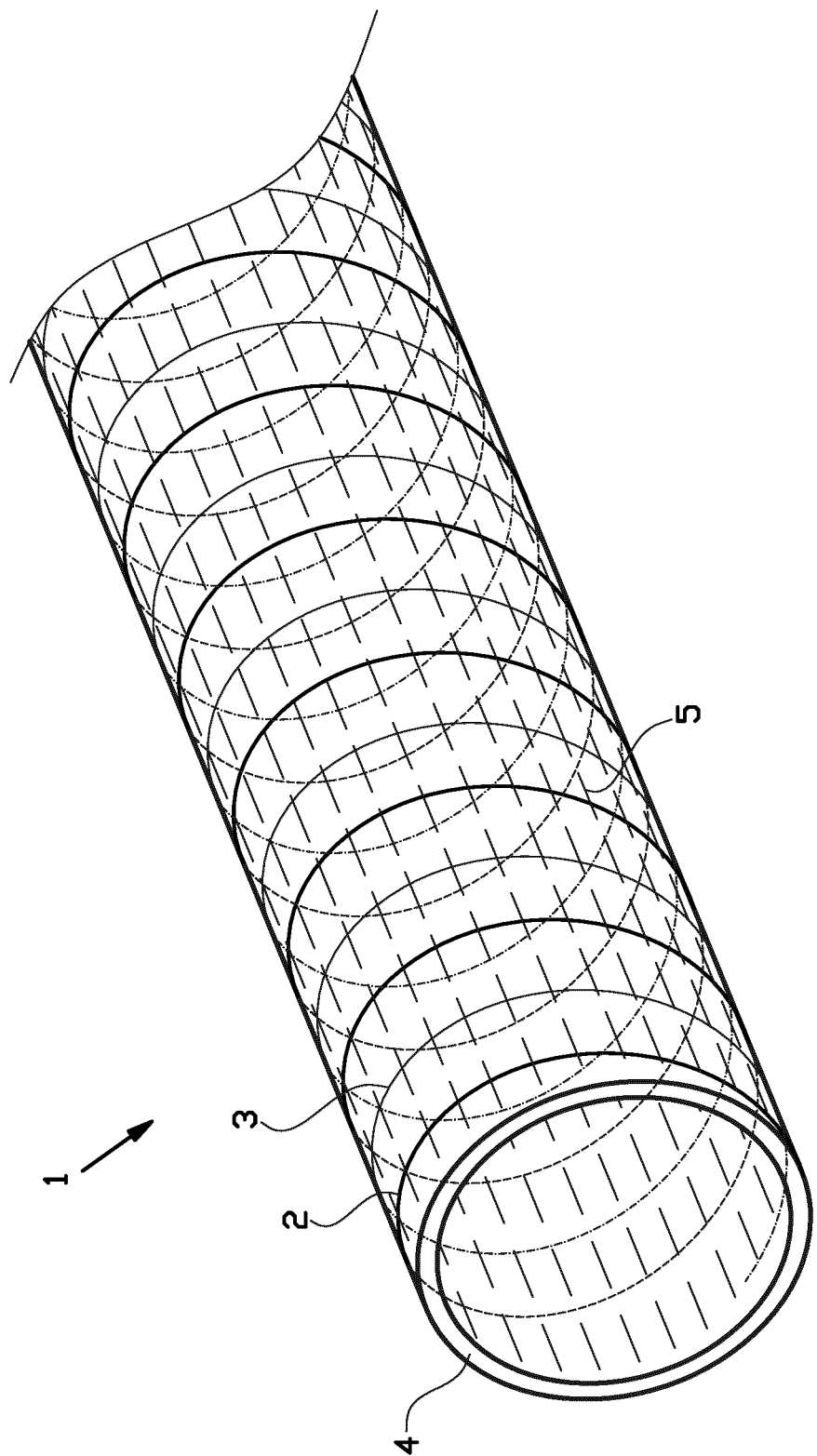

AIR DUCT AND AIR SYSTEM AND METHODS AND USES OF SAID AIR DUCT AND AIR SYSTEM

The present invention relates to an air duct and an air system. The invention also relates to methods and uses of said air ducts and air system.

INTRODUCTION

When temperatures of air passing through the ducts of an air system differ from the temperatures of surroundings, insulation of the air ducts with an insulation medium may be necessary. Insulation may be complicated to arrange, especially in the small spaces that often accommodate air ducts of air systems. Further, heating of air flowing in an air system also requires space and equipment for the same reasons.

BRIEF DESCRIPTION OF THE DRAWINGS

The invention will be elucidated on the basis of an exemplary embodiment shown in the attached drawings, in which:

FIG. 1 shows a perspective and schematic view of the air duct in accordance with the exemplary embodiment.

DESCRIPTION OF THE INVENTION

The inventor has now found a way to overcome these problems by the provision of the present invention.

The present invention relates in a first aspect to an air duct, wherein said air duct has a wall comprising electrically conductive reinforcement elements integrated with the wall and arranged in separate parallel coils distributed at a distance of each other along the pitch of the air duct, wherein the air duct wall comprises electrically conductive fibers distributed in the wall between the coils, wherein a first coil is configured as an cathode and a second coil is configured as an anode to allow realization of an electric field therebetween, across the fibers.

In a second aspect, the invention relates to an air system comprising the air duct of the first aspect in convection with a voltage source.

In a third aspect, the invention relates to a method for heating the air flowing through the air ducts of the air system according to the second aspect, comprising the step of applying an electric field between the electrically conductive coils integrated in the air duct walls.

In a fourth aspect, the invention relates to a method for insulation of walls of the air ducts of the air system according to any of the second aspect, comprising the step of applying an electric field between the electrically conductive coils integrated in the air duct walls.

In a fifth aspect, the invention relates to the use of electrically conductive elements integrated with the wall of one or more air ducts of an air system, for insulation of walls of said air ducts, and/or heating of the air flowing through the air ducts.

The use of electrically conductive elements integrated with air duct walls of an air system allows for prevention of thermal loss over the walls of said air ducts.

By the application of an electric field over the electrically conductive element by means of the voltage source heat is generated in the air duct wall in which the electrically conductive element is integrated. This heat prevents heat loss from the inside of the air duct to the outside, in case the inside air in the air duct is warmer than the surroundings. This may suitably be the case if the air system is used for purposes of heating. On the other hand, heat prevents heat entry from the outside of the air duct to the inside, in case the inside air in the air duct is colder than the surroundings. This may suitably be the case if the air system is used for purposes of cooling, such as an air conditioning system.

Further in view of this, the generation of an electric field over the fibers by the use of electrically conductive elements integrated with the wall of an air duct has a heating effect om the air flowing through it. This allows to heat the air flowing through the air ducts in an uniform fashion without the necessity for expensive equipment for heating the air.

Furthermore, the generation of an electric field in the duct wall by the use of electrically conductive elements integrated with the wall of an air duct can have a disinfecting effect om the air flowing through it. The electric field may cause conversion of oxygen into ozone, which as a disinfecting action.

In accordance with the invention, air ducts comprise reinforcement elements integrated with the wall and arranged in parallel coils distributed at a distance of each other along the pitch of the duct. In other words the reinforcement elements are arranged in a helical manner in longitudinal direction of the air duct.

The duct wall also comprises electrically conductive fibers distributed in the wall, between the reinforcement elements. This way the reinforcement elements can function as electrodes capable of forming an electric field over said fibers. A spiral arrangement of the electrically conductive element(s) results in large coverage of the duct wall, which allows in uniform local temperature increase all over the wall area of ducts. This is on its turn is advantageous for the insulation properties of the electrically conductive element(s).

The electrically conductive element functions as a reinforcement as well as a means to conduct electricity. This makes the invention particularly applicable for flexible ducts.

The air duct is preferably flexible with reinforcements. Nevertheless, also in rigid or semi-rigid ducts spiral electrically conductive elements may be used. Air ducts may in this regard be rigid ducts, semi-rigid ducts or flexible ducts, depending on their application. Ducts can have an oval, rectangular of circular cross-section or any other cross-section that is suitable. The configuration of the air ducts may vary depending on the chosen application.

Likewise, the air duct may, in addition to the electrically conductive reinforcement coils, comprise further reinforcement elements, which do not necessarily need to be electrically conductive.

The reinforcement coils are configured as electrodes capable of forming an electric field over said fibers. In this regard the reinforcement should comprises at least two separate reinforcements which are accordingly arranged in at least two separate parallel coils distributed at a distance of each other along the pitch of the air duct. A first coil may in this case function as an cathode while a second, coil, adjacent to the first coil, functions as a anode to allow realization of an electric field therebetween, across the fibers. In this regard the air duct may suitably comprise two separate coils of electrically conductive reinforcement elements, wherein a first coil functions as an cathode while a second coil functions as a anode to allow realization of an electric field therebetween, across the fibers between the coils.

The reinforcement coils can be in the form of cables, wires or threads and in this way function as electrodes to create an electric field over the electrically conductive fibers dispersed throughout the walls.

The reinforcement coils are integrated with the duct wall. That means that they are connected or attached with the wall base material. In this respect, the parallel coils can be positioned within the wall or on the inner or outer surface thereof.

In accordance with the invention, the air duct wall comprises electrically conductive fibers. Any electrically conductive material will be suitable for purposes of the invention, including conductive metals and nonmetallic conductors such as carbon (graphite) and conductive polymers. The use of fibers ensures an uniform covering of the walls with electrically conductive which is in particular advantageous in view of insulation and heating effects.

For the sake of production efficiency it may be preferred that fibers are randomly distributed within the wall material, but it is also possible to have oriented fibers, as long as an electric field with consequential heat production and insulation properties is realized between the spiral electrodes.

In a preferred embodiment the electrically conductive wall comprises carbon, for instance graphite. This material is in particularly suitable to realize the effects of the present invention, and is safe and easy in use.

In an embodiment of the invention the wall of an air duct comprises an electrical insulator material, for instance consisting of or comprising a non-woven fabric or a plastic.

This electrical insulator can be made a conductive composite material by the impregnation of a conductive material, preferably fibers, such as carbon fibers. With this composite material an air duct can be produced, for instance by extrusion, with multiple separate reinforcements, such as two reinforcements functioning as a respective anode or cathode. Also this allows coverage of the full wall area. Such air ducts can be made by extruding plastics with electrically conductive fibers of any suitable electrically conductive material, for instance using polyethylene, polypropylene or polyurethane granules with carbon fibers as starting material.

In a particularly preferred embodiment the air duct wall is formed of or contains a layer of non-woven fabric impregnated with electrically conductive fibers so as to function as electrically conductive element. This allows maximal flexibility, coverage of the full wall area with advantageous effects for insulation and heating. Moreover this material can be designed as fire resistant material, is safe in use and can be easily processed, maintained and/or replaced. Fire resistance can also be improved by using additives for this purpose.

It is preferred that the electrically conductive fibers are uniformly distributed over the full wall area. This allows uniform local temperature increase all over the wall area and consequential advantage for the insulation properties of the electrically conductive element(s).

In general, low voltages suffice for establishing the abovementioned insulation or heating properties. Therefore also in this respect, the voltage source may suitably be configured to deliver a voltage of 24 volt or less, such as 14 volt or less, or even 12 volt or less.

Furthermore, under the same conditions the generation of an electric field by the use of electrically conductive elements integrated with the wall of an air duct can have a disinfecting effect om the air flowing through it. The electric field may cause conversion of oxygen into ozone, which as a disinfecting action. Therefore, the invention also relates to the use of electrically conductive elements integrated with air ducts walls of an air system for disinfection of the air flowing through the air ducts.

Using integrated electrically conductive elements in the walls of air ducts of an air system also allows communication between functional components of an air system and/or control of functional components of an air system without effectively occupying space. Depending on the requirements the air system of the invention therefore does not necessarily require separate electric cabling between functional components of the air system.

Air ducts for purposes of this invention serve to pass air between locations and usually have an air inlet and air outlet. The air ducts can be connected with functional components, for instance via their inlets or outlets. For this purpose ducts may be provided with integrated or separate connection elements for easy connecting the ducts and other parts to obtain an air system in accordance with the invention. Functional components may also be arranged in, along or branching off from the air ducts.

In an embodiment of the invention, the electrically conductive elements also allow control of functional elements by means of electrical signaling. In this sense the electrically conductive elements allow communication between functional elements. In another aspect the electrically conductive elements allow control of functional elements by providing the required electricity in order to exert a function of a functional component.

In an embodiment, in an air system according to the invention said functional components comprise a first functional component which is a control device and a second functional component which is configured to exert an action based on input from said control device via an electric signal submitted via said electrically conductive elements.

Such a control device on its turn may be regulated from an outside source such as a computer or cell phone or the like.

The control device may also be a device that regulates the function of functional components based on feedback it obtains from one or more of such functional components.

It is preferred that the control device is configured to control multiple functional components to exert an action based on input from said control device via an electric signal submitted via said electrically conductive elements. The control device in this case functions as a central co-ordination point from which various functional components can be efficiently regulated. This efficiency is even more increased if the air system comprises a single control device configured to control multiple functional components to exert an action based on input from said control device via an electric signal submitted via said electrically conductive elements.

The said voltage source in this case is suitably integrated with the control device. The control device may be configured to send an electric signal to a functional element via the electrically conductive elements integrated in the air duct walls. A low voltage of 24 volt and lower will suffice in this respect, for instance 14 volt or lower, or 12 volt or lower. Therefore said voltage source may for instance be configured to deliver a voltage of 12 volt or less. Accordingly the methods in the context of the present invention preferably involve the application of these voltages.

The action exerted by the functional element and triggered by the control device may obtain its required energy from another source than the electrically conductive elements integrated in the air duct walls, such as another source of electric energy. The energy may also be derived via another electrically conductive element integrated in the air duct walls.

The air system in the context of this invention may be a system in a building or mean of transport. Such means of transport include cars, planes, boats, trucks etc. Without limitation the air system may be an air cleaning system, heating system, refrigeration system or air conditioning system.

Exemplary Embodiment

An example of air duct for use in accordance with the invention is shown in FIG. 1. Such an air duct can be incorporated in an exemplary air system according to the invention between functional components and be used in accordance with the invention The following explanation is meant to illustrate the principle of the invention in accordance with an exemplary embodiment and not to limit the invention.

FIG. 1 shows a perspective and schematic overview of part of an air duct 1. Air duct 1 comprises electrically conductive reinforcement wires 2, 3 integrated with the wall 4 and arranged in parallel coils distributed at a distance of each other along the pitch of the air duct 1. The air duct wall 4 comprises an electrical insulator material with electrically conductive fibers 5 distributed in the wall such that an electric field can be applied between consecutive wires 2 and 3. The reinforcement wires 2, 3 on their turn are configured as electrodes capable of forming an electric field over said fibers. For instance wire 2 can be configured as anode and wire 3 can be configured as cathode or vice versa. The wall 4 of air duct 1 comprises an electrical insulator material, for instance comprising or consisting of a non-woven fabric or a plastic. The wall 4 can be made a conductive composite material by the impregnation of conductive fibers 5, such as carbon fibers. The spiral arrangement of the reinforcements 2, 3 in combination with the fibers 5 results in large coverage of the duct wall. An electric field can be applied to the reinforcement 2, 3, which function as electrodes. Due to the impregnation of the wall 1 with electrically conductive fibers 5, this results in uniform heating of the air duct 1 along the full length of the duct. In line with this, uniform heating and disinfection of air flowing in the air duct 1 can be obtained.

The inventors have found in this respect that when a voltage of 14 volt was applied over reinforcement wires 2, 3 integrated with a non-woven fabric, wherein in the non-woven fabric carbon fibers were distributed, the inner surface of the duct was uniformly heated to 28° C. as compared to an ambient temperature of around 20° C.

Although FIG. 1 shows a symmetric air duct, an air duct for use in the context of the invention may also be asymmetric in cross-section depending on the wishes of the user, for instance elliptic or rectangular. Likewise the duct may be flexible or rigid. The duct may be provided with a connection element for easy connecting the ducts and other parts to obtain an air system in accordance with the invention.

The invention claimed is:

1. An air duct in an air heating or air conditioning system, said air duct configured for connection with a voltage source and comprising:
   a wall comprising electrically conductive reinforcement elements integrated with the wall and arranged in separate parallel coils distributed at a distance from each other along a pitch of the air duct, wherein the wall of the air duct further comprises electrically conductive fibers distributed in the wall between the coils, and wherein a first coil of the parallel coils is configured as a cathode and a second coil of the parallel coils is configured as an anode to allow realization of an electric field therebetween and across the fibers;
   wherein said electrically conductive reinforcement elements are configured to generate heat in the wall of the air duct, in which the electrically conductive elements are integrated, upon application of electrical energy from said voltage source for prevention of thermal loss over the walls of said air duct;
   wherein said heat prevents heat loss from inside of the air duct to outside of the air duct, in case air inside the air duct is warmer than a surrounding outside of the air duct; and
   wherein said heat prevents heat entry from outside of the air duct to inside of the air duct, in case the air inside the air duct is colder than the surrounding outside of the air duct.

2. The air duct according to claim 1, wherein said wall of said air duct contains a layer of non-woven fabric impregnated with said electrically conductive fibers.

3. The air duct according to claim 1, wherein said electrically conductive fibers are impregnated in plastic.

4. The air duct according to claim 1, wherein said electrically conductive fibers are carbon fibers.

5. The air duct according to claim 1, wherein said reinforcement elements are in the form of cables, wires or threads.

6. The air duct according to claim 1, wherein the voltage source is 24 volts or less.

7. The air duct according to claim 6, wherein the voltage source is 14 volts or less.

8. The air duct according to claim 6, wherein the voltage source is 12 volts or less.

\* \* \* \* \*